Figure 1:
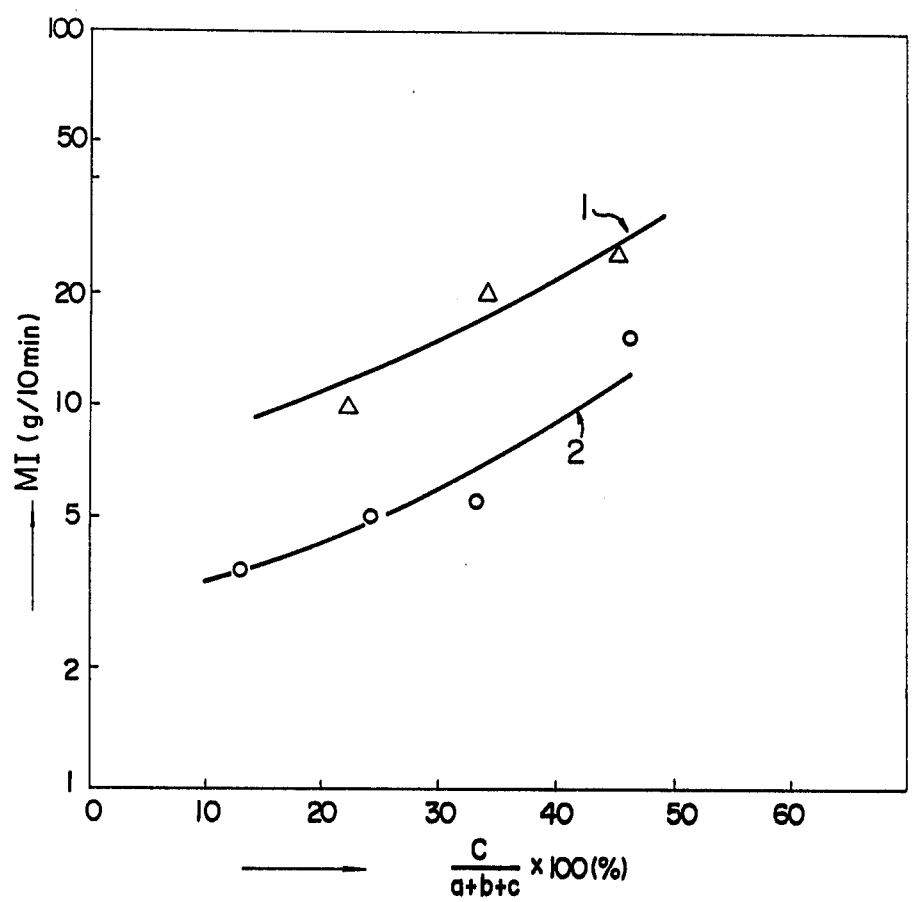

United States Patent [19]

Iwami et al.

[11] 4,105,709

[45] Aug. 8, 1978

[54] POLYAMIDE COMPOSITIONS

[75] Inventors: Isamu Iwami; Hironobu Kawasaki; Atsuro Kodama, all of Kawasaki, Japan

[73] Assignee: Asahi-Dow Limited, Tokyo, Japan

[21] Appl. No.: 671,743

[22] Filed: Mar. 30, 1976

[30] Foreign Application Priority Data

Apr. 3, 1975 [JP] Japan ................................ 75-39755

[51] Int. Cl.² ............................................. C08L 77/00
[52] U.S. Cl. .............................. 260/857 L; 260/37 N; 260/42.18; 260/857 UN
[58] Field of Search ................................... 260/857 L

[56] References Cited

U.S. PATENT DOCUMENTS

| | | | |
|---|---|---|---|
| 3,264,272 | 8/1966 | Rees | 526/13 |
| 3,492,367 | 1/1970 | Starkweather | 260/857 L |
| 3,628,993 | 12/1971 | Gilbert | 260/857 L |
| 3,676,400 | 7/1972 | Kohan | 260/857 L |
| 3,833,708 | 9/1974 | Miller | 260/857 L |
| 3,845,163 | 10/1974 | Murch | 260/857 L |
| 4,035,436 | 7/1977 | Matsubara | 260/857 L |

FOREIGN PATENT DOCUMENTS

| | | | |
|---|---|---|---|
| 740,501 | 8/1966 | Canada | 260/857 L |
| 46-35367 | 10/1971 | Japan | 260/857 L |
| 6,705,238 | 6/1967 | Netherlands | 260/857 L |
| 6,705,239 | 6/1967 | Netherlands | 260/857 L |

*Primary Examiner*—Paul Lieberman
*Attorney, Agent, or Firm*—Cooper, Dunham, Clark, Griffin & Moran

[57] ABSTRACT

A polyamide composition comprising 50 to 95 parts by weight of a polyamide and 50 to 5 parts by weight of an ethylenic copolymer of ethylene, an alkyl ester of unsaturated carboxylic acid, an unsaturated carboxylic acid and a metal salt of unsaturated carboxylic acid has excellent processability such as fluidity at melting and remarkably improved impact strength when molded. The polyamide composition may further contain one or more inorganic materials such as glass fiber without lowering physical properties.

15 Claims, 3 Drawing Figures

POLYAMIDE COMPOSITIONS

This invention relates to a novel composition comprising a polyamide and an ethylenic copolymer.

Polyamides in general are excellent in wear resistance, high temperature resistance, electrical properties, etc., and when inorganic materials such as glass fiber are added to the polyamides, their high temperature resistance, stiffness and mechanical properties are more improved, so that the polyamides are used alone or together with inorganic materials such as glass fiber to produce electrical parts, automotive parts, machine parts, and the like. But most fatal defect of the polyamides is their low impact strength. Further the polyamides by themselves are bad in dimentional stability and those together with inorganic materials have defects in surface appearance of the shaped articles, warpage due to anisotropy in shrinkage, and the like.

In order to improve these defects of the polyamides, various methods and polyamide compositions have been proposed. For example, British Patent No. 1,224,094 discloses a composition comprising an intimate blend of nylon and an ionic copolymer of an alpha-olefin monomer and a comonomer, which comonomer is an alpha,beta-ethylenically unsaturated caroxylic acid or anhydride thereof or a monoester of an alpha,beta-ethylenically unsaturated dicarboxylic acid, at least 5% of the acid groups in the copolymer being neutralized with metal ions. U.S. Pat. No. 3,845,163 discloses a process for improving the weld-line toughness of an article molded from a blend of a polyamide and a copolymer of units derived from an alpha-olefin and units derived from an alpha,beta-ethylenically unsaturated carboxylic acid. But the compositions disclosed in the above-mentioned British patent and U.S. patent are still insufficient for improving impact strength of molded articles. Further since fluidity of the compositions at molding is not so good particularly when the compositions contain inorganic materials such as glass fiber or calcium carbonate or articles to be molded have complicated shapes or large sizes, improvement in the fluidity has long been desired.

It is an object of the present invention to provide a polyamide composition improving these defects of polyamides, particularly having remarkable improvement in impact strength of the shaped articles and processability.

The present invention provides a polyamide composition comprising (A) 50 to 95 parts by weight of a polyamide and (B) 50 to 5 parts by weight of an ethylenic copolymer of ethylene, (a) an alkyl ester of unsaturated carboxylic acid, (b) an unsaturated carboxylic acid, and (c) a metal salt of unsaturated carboxylic acid, the proportion of ethylene in the copolymer being from 90% to 98% by mole and the proportions of the monomeric units (a), (b) and (c) in the copolymer being from 10% to 2% by mole, and the units (a), (b) and (c) having the following relationship in terms of the number of moles a, b and c, respectively:

$a/(a + b + c) \times 100 = 5 - 50\%$, and
$c/(a + b + c) \times 100 = 5 - 90\%$.

The polyamide used in the present invention is a linear synthetic high polymer having the acid amide bond of —CONH—. Examples of the polyamide include nylons such as nylon-6, nylon-6,6, nylon-6,10, nylon-3, nylon-4, nylon-6,12, nylon-11, nylon-12, and the like, which are crystalline polyamides. Among them, nylon-6 and nylon-6,6 are more preferable.

The ethylenic copolymer has the monomeric units derived from ethylene, the monomeric units (a) derived from an alkyl ester of unsaturated carboxylic acid, the monomeric units (b) derived from an unsaturated carboxylic acid and the monomeric units (c) derived from a metal salt of unsaturated carboxylic acid. Proportion of the ethylene units in the copolymer is 90 to 98% by mole and that of the monomeric units of (a), (b) and (c) is 10 to 2% by mole. i) The alkyl ester of unsaturated carboxylic acid means alkyl esters of unsaturated carboxylic acids preferably having 3 to 8 carbon atoms which include, for example, acrylic acid, methacrylic acid, ethacrylic acid, and the like. Examples of the alkyl esters of unsaturated carboxylic acids are methyl acrylate, ethyl acrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate, isobutyl methacrylate, and the like. Among them, methyl acrylate, ethyl acrylate, methyl methacrylate and n-butyl methacrylate are more preferable. ii) The unsaturated carboxylic acid means unsaturated carboxylic acids preferably having 3 to 8 carbon atoms as mentioned in above item i). iii) The metal salt of unsaturated carboxylic acid means metal salts of the above-mentioned unsaturated carboxylic acids. As the metals, those of Groups IA, IB, IIA, IIB, IIIA and the fourth period in Group VIII of the periodic table such as Na, K, Cu, Mg, Ca, Ba, Zn, Cd, Al, Fe, Co and Ni are preferable. Among them, Na, K, Mg, Ca, Ba and Zn are more preferable.

In the ethylenic copolymer, the proportion of the ethylene units must be from 90 to 98% by mole. If the ethylene is less than 90% by mole, there is a disadvantage in that it is very difficult to produce the ethylenic copolymer using a conventional device for high-pressure-processed polyethylene. If the ethylene is more than 98% by mole, the improvement in impact strength is insufficient.

The proportions of the monomeric units (a), (b) and (c) in the ethylenic copolymer are from 10 to 2% by mole. Further the proportion of the alkyl ester of unsaturated carboxylic acid unit (a) must satisfy the following condition:

$a/(a + b + c) \times 100 = 5 - 50\%$, preferably $10 - 40\%$ wherein $a$, $b$ and $c$ are the number of moles of the units (a), (b) and (c), respectively. If the value of $a/(a + b + c) \times 100$ is less than 5%, remarkably improved processability of the present invention, for example, improvement of fluidity at melting, cannot be attained sufficiently and if the value is more than 50%, physical properties of shaped articles made from the composition of the present invention, for example, tensile strength, and the like, are lowered considerably.

The proportion of the metal salt of unsaturated carboxylic acid unit (c) must satisfy the following condition:

$c/(a + b + c) \times 100 = 5 - 90\%$, preferably $10 - 85\%$ wherein $a$, $b$ and $c$ are as defined above. If the value of $c/(a + b + c) \times 100$ is less than 5%, fluidity at melting is lowered, and if the value is more than 90%, improvement in impact strength is insufficient.

The unsaturated carboxylic acid unit (b) seems to be necessary in preparing the composition of the present invention by mixing the polyamide and the ethylenic copolymer in order to impart affinity with the polyamide to the ethylenic copolymer.

The ethylenic copolymer can be prepared, for example, by the process disclosed in U.S. Pat. No. 3,789,035.

The composition of the present invention comprises 50 to 95 parts by weight, preferably 65 to 90 parts by weight, of the polyamide and 50 to 5 parts by weight, preferably 35 to 10 parts by weight, of the ethylenic copolymer, the total weight of the polyamide and the ethylenic copolymer being 100 parts by weight. If the ethylenic copolymer is less than 5 parts by weight, improvement in impact strength is insufficient, and if the ethylenic copolymer is more than 50 parts by weight, physical properties such as tensile strength and heat distortion temperature of the shaped articles are lowered remarkably.

The composition of the present invention can be prepared by using conventional mixing methods, for example, by a melting kneading method using a conventional single or twin screw extruder.

One or more inorganic materials such as glass fiber, asbestos, bentonite, diatomaceous earth, talc, calcium carbonate, calcium sulfate, calcium sulfite, and the like can be incorporated in the composition of the present invention as reinforcer or filler.

The inorganic material containing composition can be prepared by mixing 50 to 95 parts by weight, preferably 60 to 85 parts by weight, of the polyamide composition with 50 to 5 parts by weight, preferably 40 to 45 parts by weight, of the inorganic material, the total weight of the polyamide composition and the inorganic material being 100 parts by weight. If the inorganic material is less than 5 parts by weight, the improvements in high temperature resistance, mechanical strengths and dimensional stability of the shaped articles are insufficient, and if the inorganic material is more than 50 parts by weight, processability decreases and impact strength and surface appearance of the shaped articles are lowered.

The inorganic material containing composition can be prepared by using conventional mixing methods. A preferable method for improving impact strength and other physical properties is to prepare previously the polyamide composition by melt kneading the polyamide and the ethylenic copolymer as mentioned above and then to melt knead the resulting polyamide composition with the inorganic material.

Other additives such as heat stabilizers, ultraviolet inhibitors, plasticizers, dyes, pigments, and the like can be added to the polyamide compositions and the inorganic material containing compositions of the present invention.

When the polyamide composition and the inorganic material containing composition of the present invention are used, not only great improvement in impact strength of the shaped articles but also excellent improvement in processability such as fluidity at melting, which can be expressed by the melt index according to ASTM D-1238, can be attained. Further dimensional stability and warpage due to anisotropy in shrinkage, particularly when the composition contains the inorganic materials, are improved remarkably. In addition, surface appearance of the molded articles such as gloss and uniformity of color tone is also improved greatly.

The present invention is illustrated more particularly by way of the following examples.

REFERENTIAL EXAMPLE

Preparation of ethylenic copolymers

The ethylenic copolymers were prepared according to U.S. Pat. No. 3,789,035 as follows.

(1) Ethylene and methyl methacrylate were copolymerized under conventional reaction conditions for preparing ethylenic copolymers using a high-pressure-processed polyethylene device to give ethylene-methyl methacrylate copolymer containing 95.3% by mole of ethylene and 4.7% by mole of methyl methacrylate and having a melt index (ASTM D-1238) of 67 g/10 min.

(2) The resulting ethylene-methyl methacrylate copolymer was charged in a reactor with benzene, methanol and sodium hydroxide and saponification was carried out at 120° C for 2 hours. After the reaction, a slurry containing the saponified product was obtained with colling. The conversion of methyl methacrylate, i.e., the degree of retained methyl methacrylate ($a/(a + b + c) \times 100$), was easily controlled by the amount of sodium hdyroxide to be added.

(3) The saponified product was separated by filtration and dispersed in water, to which an aqueous solution of sulfric acid was added and the demetallizing reaction was carried out to adjust the proportion of the methacrylic acid and the sodium salt of methacrylic acid ($c/(a + b + c) \times 100$) to the desired value.

Thus the ethylenic copolymers as set forth in Table 1 were obtained.

(4) If required, the product obtained in the above step (3) was dispersed in water and an aqueous solution of $CaCl_2$ was added thereto to exchange the metal ion from Na to Ca.

Table 1

| Ethylenic copolymer No. | $a/(a + b + c) \times 100$ (%) | $c/(a + b + c) \times 100$ (%) | Metal |
|---|---|---|---|
| 01 | 0 | 33 | Na |
| 1 | 2 | 46 | " |
| 2 | 2 | 33 | " |
| 3 | 2 | 24 | " |
| 4 | 2 | 13 | " |
| 5 | 14 | 46 | " |
| 6 | 14 | 34 | " |
| 7 | 28 | 45 | " |
| 8 | 28 | 34 | " |
| 9 | 28 | 22 | " |
| 10 | 38 | 49 | " |
| 11 | 28 | 23 | Ca |

EXAMPLE 1

Preparation of polyamide compositions

Using a twin screw extruder, 30 mm $\phi$, nylon-6,6 (A) ($\eta$rel 52), nylon-6,6 (B) ($\eta$rel 41) and nylon-6 (M.I. 12.1, manufactured by Toray Industries Inc., Amilan ® CM 1017) were melting kneaded with ethylenic copolymers prepared in Referential Example as set forth in Table 1. (Note: Relative viscosity of nylon-6,6 was measured according to JIS K6810, i.e., dissolving 5.5 g of the sample in 50 ml of 90% formic acid and measuring at 25° C. Melt index of nylon-6 was measured according to ASTM D-1238 using 325 g of load at 275° C.) Melt kneading temperature was 270° C in the case of nylon-6,6 and 250° C in the case of nylon-6. Thus the polyamide compositions as set forth in Table 2 were obtained.

Table 2

| Polyamide composition No. | Polyamide | Ethylenic copolymer No. (See Table 1) | Mixing ratio (wt.) Polyamide/ Ethylenic copolymer |
|---|---|---|---|
| NI-01 | Nylon-6,6 (A) | No. 01 | 80/20 |
| NI-1 | " | No. 1 | " |
| NI-2 | " | No. 2 | " |
| NI-3 | " | No. 3 | " |
| NI-4 | " | No. 4 | " |
| NI-5 | " | No. 5 | " |
| NI-6 | " | No. 6 | " |
| NI-7 | " | No. 7 | " |
| NI-8 | " | No. 8 | " |
| NI-9 | " | No. 9 | " |
| NI-10 | " | No. 10 | " |
| NI-11 | " | No. 11 | " |
| NI-12 | Nylon-6,6 (B) | No. 1 | " |
| NI-13 | " | No. 5 | " |
| NI-14 | " | No. 7 | " |
| NI-15 | Nylon-6 | No. 01 | " |
| NI-16 | " | No. 8 | " |
| NI-17 | " | No. 01 | 60/40 |
| NI-18 | " | No. 8 | " |

EXAMPLE 2

Evaluation of polyamide compositions

Some of the polyamide compositions prepared in Example 1 were molded into test specimens for measuring physical properties using an injection-molding machine at 270° C. The test specimens were allowed to stand in a desiccator containing silica gel placed in a room kept at a constant temperature (23° C) for 24 hours.

Physical properties were measured as follows:

| | |
|---|---|
| Melt index | ASTM D-1238 |
| Izod impact strength | ASTM D-256 |
| Tensile strength | ASTM D-638 |
| Heat distortion temperature | ASTM D-648 |

Figure 2:
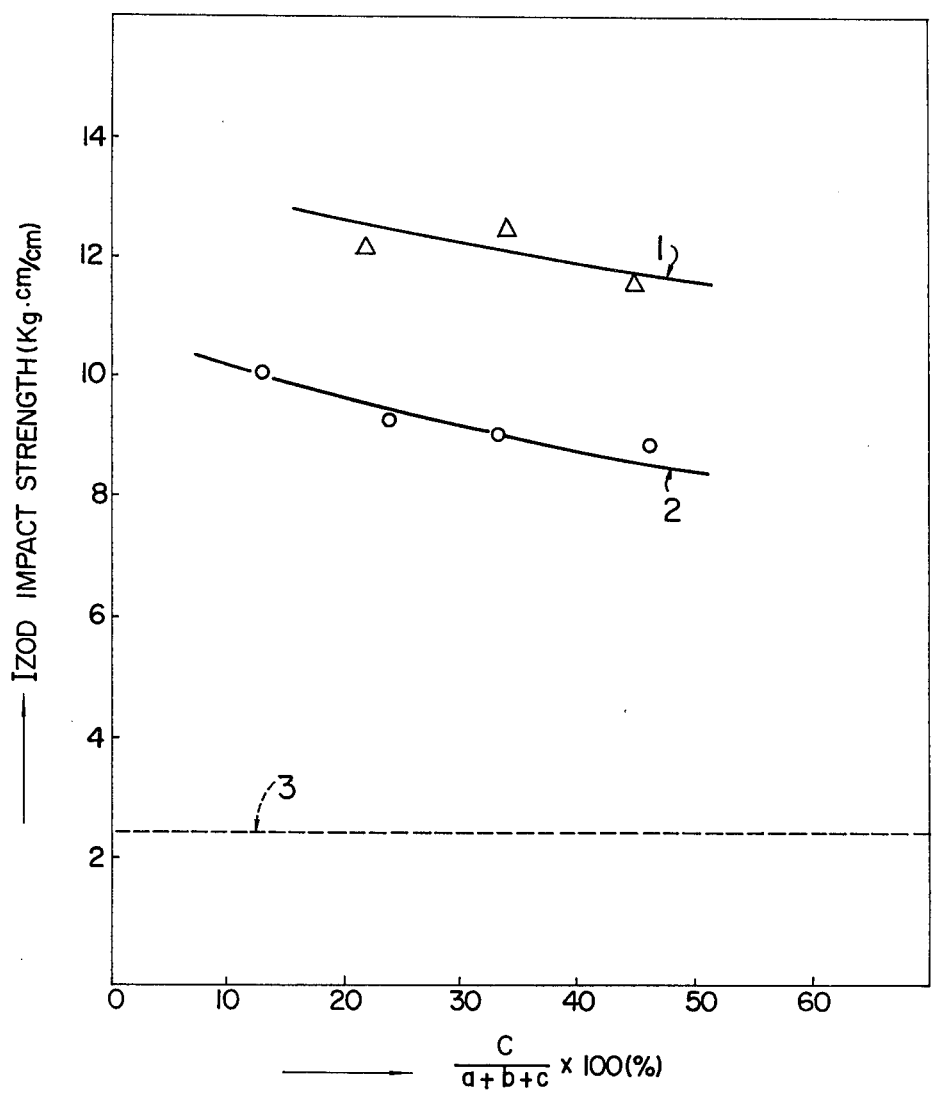

The results obtained are as shown in Table 3 and FIGS. 1 and 2.

FIG. 1 shows the relationship between melt index and the proportion of $c/(a + b + c) \times 100$. FIG. 2 shows the relationship between izod impact strength and the proportion of $c/(a + b + c) \times 100$. In FIGS. 1 and 2, the line 1 shows the values at $a/(a + b + c) \times 100$ being 28% and the line 2 shows the values at $a/(a + b + c) \times 100$ being 2%. In FIG. 2, the broken line shows impact strength of nylon-6,6 (A) alone.

TABLE 3

| Run No. | Polyamide composition No. | Ethylenic copolymer No. | Melt index 275° C, 2.16 kg (g/10 min) | Izod impact strength (kg · cm/cm) | Tensile strength at yield (kg/cm²) | Heat distortion temp. (° C) 18.6 kg/cm² |
|---|---|---|---|---|---|---|
| 1 | NI-01 | No. 01 | 5.5 | 9.0 | 620 | 64 |
| 2 | NI-1 | No. 1 | 15.5 | 8.9 | 620 | 64 |
| 3 | NI-2 | No. 2 | 5.7 | 9.1 | — | — |
| 4 | NI-3 | No. 3 | 5.1 | 9.3 | — | — |
| 5 | NI-4 | No. 4 | 3.7 | 10.1 | — | — |
| 6 | NI-7 | No. 7 | 26.0 | 11.6 | 620 | 58 |
| 7 | NI-8 | No. 8 | 20.1 | 12.5 | — | — |
| 8 | NI-9 | No. 9 | 10.1 | 12.2 | — | — |
| 9 | NI-11 | No. 11 | 11.3 | 12.1 | 630 | 60 |
| 10 | Nylon-6,6 (A)* | — | — | 2.5 | 820 | 70 |

Note)
*Nylon-6,6 (A) alone was used in place of the polyamide composition.

As is clear from Table 3 and FIGS. 1 and 2, the polyamide compositions of the present invention are remarkably improved in fluidity at melting and impact strength.

EXAMPLE 3

Preparation and evaluation of polyamide compositions reinforced with glass fibers (nylon-6,6, glass fiber content 17% by weight)

(1) Using a single screw extruder, 4.15 kg of polyamide composition prepared in Example 1 was melt kneaded with 0.85 kg of glass fiber (manufactured by Asahi Fiber Glass Co., Ltd., CS-03-MA-411) at 290° C. Thus the polyamide compositions reinforced with glass fibers were obtained as set forth in Table 4.

(2) The polyamide compositions reinforced with glass fibers were molded into test specimens for measuring physical properties using an injection-molding machine at 290° C. The test specimens were allowed to stand in a desiccator containing silica gel placed in a room kept at a constant temperature (23° C) for 24 hours. Physical properties of the test specimens were measured in the same manner as described in Example 2. Falling weight impact strength was measured as follows:

Test specimen: a flat plate (130 × 110 × 3 mm)
Height of falling weight: 50 cm
Curvature of the apex of falling weight: 20 mm
Weight increment being used: 50 g
Impact strength: impact value at 50% breakage
The results obtained are as shown in Table 4.

As is clear from Table 4, the compositions of the present invention are remarkably improved in fluidity at melting and impact strength.

Table 4

| Run No. | Glass fiber (wt. %) | Polyamide composition No. | Ethylenic copolymer No. | Melt index 275° C, 2.16 kg (g/10 min) | Falling weight impact strength (kg · cm) | Tensile strength at break (kg/cm²) | Heat distortion temp. (° C) 18.6 kg/cm² |
|---|---|---|---|---|---|---|---|
| 1 | 17 | NI-1 | No. 1 | 3.0 | 65 | 1170 | 231 |
| 2 | 17 | NI-5 | No. 5 | 5.4 | 84 | 1170 | 230 |
| 3 | 17 | NI-7 | No. 7 | 8.5 | 92 | 1160 | 229 |
| 4 | 17 | NI-10 | No. 10 | 13.5 | 87 | 1150 | 230 |

Table 4-continued

| Run No. | Glass fiber (wt. %) | Polyamide composition No. | Ethylenic copolymer No. | Melt index 275° C, 2.16 kg (g/10 min) | Falling weight impact strength (kg · cm) | Tensile strength at break (kg/cm$^2$) | Heat distortion temp. (° C) 18.6 kg/cm$^2$ |
|---|---|---|---|---|---|---|---|
| 5 | 17 | Nylon-6,6 (A)* | — | 20.3 | 17 | 1260 | 233 |

Note)
*Nylon-6,6 (A) alone was used in place of the polyamide composition.

EXAMPLE 4

Figure 3:
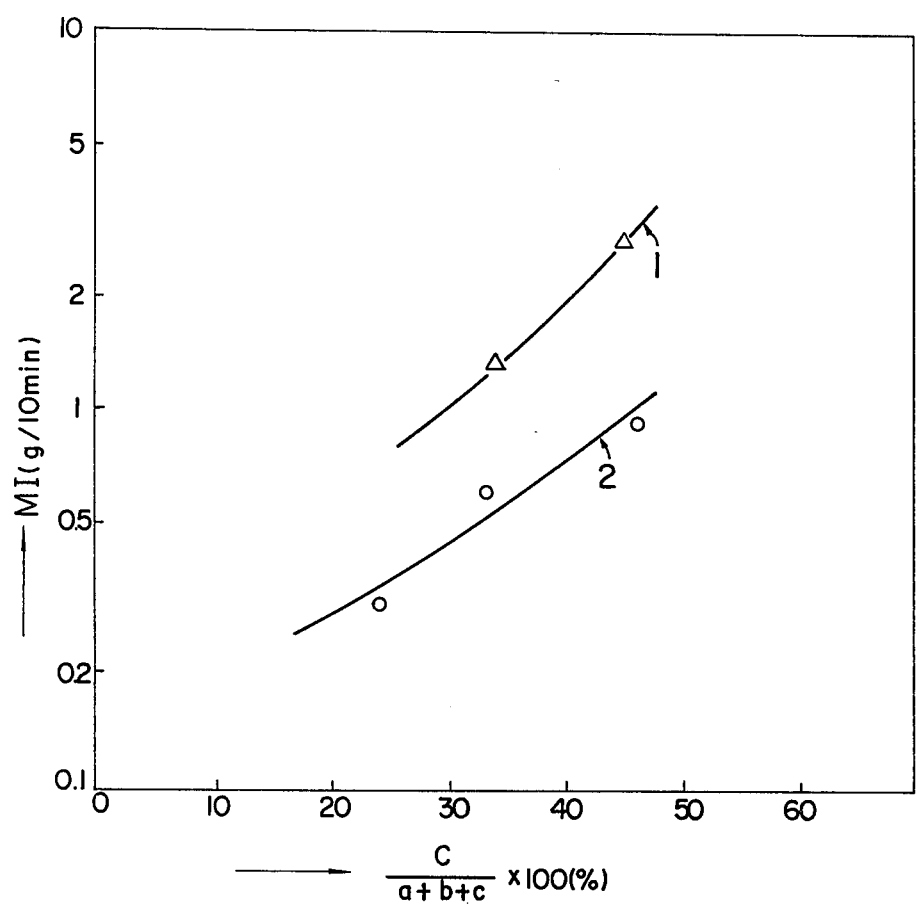

The results obtained are as shown in Table 5 and FIG. 3.

Table 5

| Run No. | Glass fiber (wt. %) | Polyamide composition No. | Ethylenic copolymer No. | Melt index 275° C, 2.16 kg (g/10 min) | Falling weight impact strength (kg · cm) | Warpage (mm) | Tensile strength at break (kg/cm$^2$) | Heat distortion temp. (° C) 18.6 kg/cm$^2$ |
|---|---|---|---|---|---|---|---|---|
| 1 | 33 | NI-1 | No. 1 | 0.9 | 53 | 5.3 | 1650 | 239 |
| 2 | 33 | NI-2 | No. 2 | 0.6 | 52 | — | — | — |
| 3 | 33 | NI-3 | No. 3 | 0.3 | 50 | — | — | — |
| 4 | 33 | NI-5 | No. 5 | — | 62 | 1.0 | 1590 | 239 |
| 5 | 33 | NI-6 | No. 6 | — | 60 | — | — | — |
| 6 | 33 | NI-7 | No. 7 | 2.8 | 66 | 0.8 | 1550 | 238 |
| 7 | 33 | NI-8 | No. 8 | 1.3 | 63 | — | — | — |
| 8 | 33 | NI-10 | No. 10 | 8.3 | 76 | 1.5 | 1510 | 237 |
| 9 | 33 | Nylon-6,6 (A)* | — | 13.3 | 23 | 11.8 | 1790 | 240 |

Note)
*Nylon-6,6 (A) alone was used in place of the polyamide composition.

Preparation and evaluation of polyamide compositions reinforced with glass fibers (nylon-6,6, glass fiber content 33% by weight)

(1) Using a single screw extruder, 6.7 kg of polyamide composition prepared in Example 1 was melt kneaded with 3.3 kg of glass fiber (manufactured by Asahi Fiber Glass Co., Ltd., CS-03-MA-411) at 290° C. Thus the polyamide compositions reinforced with glass fibers were obtained as set forth in Table 5.

(2) The polyamide compositions reinforced with glass fibers were molded into test specimens for measuring physical properties using an injection-molding machine at 290° C. The test specimens were allowed to stand in a desiccator containing silica gel placed in a room kept at a constant temperature (23° C) for 24 hours. Physical properties of the test specimens were measured in the same manner as described in Example 3. Warpage was measured as follows: A small flat rectangular plate (130 × 110 × 3 mm) was injection molded at 290° C and then the plate was allowed to stand in a room kept at a constant temperature (temperature 23° C, relative humidity 50%) for 150 hours to measure degree of deformation. The degree of deformation was measured as follows. The test plate was placed on a flat glass plate, where two neighboring vertexes of the test plate were fixed on the glass plate and the distances between the two opposite free vertexes and the glass plate were measured and a larger value was employed.

FIG. 3 shows the relationship between melt index and the proportion of $c/(a + b + c) \times 100$. In FIG. 3, the line 1 shows the values at $a/(a + b + c) \times 100$ being 28% and the line 2 shows the values at $a/(a + b + c) \times 100$ being 2%.

As is clear from Table 5 and FIG. 3, the compositions of the present invention are remarkably improved in fluidity at melting and impact strength.

EXAMPLE 5

Preparation and evaluation of polyamide composition reinforced with glass fiber (nylon-6, glass fiber content 17% by weight)

Using the same procedure as described in Example 3 except for employing the kneading temperature of 260° C and the injection molding temperature of 260° C, the polyamide compositions as set forth in Table 6 were prepared and tested.

The results obtained are as shown in Table 6.

Table 6

| Run No. | Glass fiber (wt. %) | Polyamide composition No. | Ethylenic copolymer No. | Melt index 275° C. 2.16 kg (g/10 min) | Falling weight impact strength (kg · cm) | Tensile strength at break (kg/cm$^2$) | Heat distortion temp. (° C) 18.6 kg/cm$^2$ |
|---|---|---|---|---|---|---|---|
| 1 | 17 | NI-15 | No. 01 | 9.8 | 36 | 1030 | 176 |
| 2 | 17 | NI-16 | No. 8 | 16.3 | 53 | 1030 | 176 |
| 3 | 17 | NI-17 | No. 01 | 1.8 | 31 | 730 | 152 |
| 4 | 17 | NI-18 | No. 8 | 4.3 | 42 | 720 | 153 |
| 5 | 17 | Nylon-6* | — | 33.6 | 14 | 1190 | 178 |

Note)
*Nylon-6 alone was used in place of the polyamide composition.

As is clear from Table 6, the compositions of the present invention are remarkably improved in fluidity at melting and toughness.

EXAMPLE 6

Preparation and evaluation of polyamide compositions filled with calcium carbonate (1) Using a twin screw extruder, 6.7 kg of polyamide composition prepared in Example 1 was melt kneaded with 3.3 kg of calcium carbonate (manufactured by Toyo Fine Chemical Co., Ltd., Whiten P-30) at 280° C. Thus the polyamide compositions filled with calcium carbonate were obtained as set force in Table 7.

(2) The polyamide compositions filled with calcium carbonate were molded into test specimens for measuring physical properties using an injection-molding machine at 290° C. The test specimens were allowed to stand in a desiccator containing silica gel placed in a room kept at a constant temperature (23° C) for 24 hours. Falling weight impact strength and tensile strength at break of the test specimens were measured in the same manner as described in Example 3.

The results obtained are as shown in Table 7.

As is clear from Table 7, the compositions of the present invention are remarkably improved in impact strength.

Table 7

| Run No. | Polyamide composition No. | Ethylenic copolymer No. | Falling weight impact strength (kg . cm) | Tensile strength at break (kg/cm$^2$) |
|---|---|---|---|---|
| 1 | NI-12 | No. 1 | 42 | 630 |
| 2 | NI-13 | No. 5 | 56 | 610 |
| 3 | NI-14 | No. 7 | 60 | 570 |
| 4 | Nylon-6,6 (B)* | — | 10 | 880 |

Note)
1) In Run No. 4, nylon-6,6 (B) alone was used in place of the polyamide composition.
2) The molded articles of Run Nos. 1, 2 and 3, particularly Run Nos. 2 and 3 had glossy surfaces and uniform color tone comparing with that of Run No. 4.

What is claimed is:

1. A composition comprising (A) 50 to 95 parts by weight of a polyamide and (B) 50 to 5 parts by weight of an ethylenic copolymer of ethylene, (a) an alkyl ester of unsaturated carboxylic acid, (b) an unsaturated carboxylic acid, an (c) a metal salt of unsaturated carboxylic acid, the proportion of ethylene in the copolymer being from 90% to 98% by mole and the monomeric units (a), (b) and (c) having the following relationship in terms of the number of moles $a$, $b$, and $c$, respectively:

$a/(a + b + c) \times 100 = 5 - 50\%$ and
$c/(a + b + c) \times 100 = 5 - 90\%$.

2. A composition according to claim 1, wherein the amount of polyamide is 65 to 90 parts by weight and the amount of ethylenic copolymer is 35 to 10 parts by weight.

3. A composition according to claim 1, wherein the polyamide is nylon-6, nylon-6,6, nylon-6,10, nylon-3, nylon-4, nylon-6,12, nylon-11, or nylon-12.

4. A composition according to claim 1, wherein the polyamide is nylon-6,6 or nylon-6.

5. A composition according to claim 1, wherein the ethylenic copolymer contains the monomeric units (a), (b) and (c) in the proportions of $a/(a + b + c) \times 100 = 10 - 40\%$ and
$c/(a + b + c) \times 100 = 10 - 85\%$ wherein a, b and c are the number of moles of the monomeric units (a), (b) and (c).

6. A composition according to claim 1, wherein the alkyl ester of unsaturated carboxylic acid is methyl acrylate, ethyl acrylate, n-butyl methacrylate, n-propyl acrylate, isopropyl acrylate, n-butyl acrylate, t-butyl acrylate, isobutyl acrylate, methyl methacrylate, ethyl methacrylate, n-propyl methacrylate, isopropyl methacrylate, n-butyl methacrylate, t-butyl methacrylate, or isobutyl methacrylate.

7. A composition according to claim 1, wherein the alkyl ester of unsaturated carboxylic acid is methyl acrylate, ethyl acrylate or methyl methacrylate.

8. A composition according to claim 1, wherein the unsaturated carboxylic acid is acrylic acid, methacrylic acid or ethacrylic acid.

9. A composition according to claim 1, wherein the metal of the metal salt of unsaturated carboxylic acid is Na, K, Mg, Ca, Ba, Zn, Cu, Cd, Al, Fe, Co or Ni.

10. A composition according to claim 1, wherein the metal of the metal salt of unsaturated carboxylic acid is Na, K, Mg, Ca, Ba or Zn.

11. A composition according to claim 1, wherein the polyamide is nylon-6,6 and the ethylenic copolymer is a copolymer of ethylene, methyl methacrylate, methacrylic acid and sodium salt of methacrylic acid.

12. A composition comprising (I) 50 - 95 parts by weight of the composition as claimed in claim 1 and (II) 50 - 5 parts by weight of one or more inorganic materials.

13. A composition according to claim 12, wherein the inorganic material is glass fiber, asbestos, bentonite, diatomaceous earth, talc, calcium carbonate, calcium sulfate or calcium sulfite.

14. A composition according to claim 12, wherein the inorganic material is glass fiber.

15. A process for preparing the composition as claimed in claim 12 which comprises preparing previously the polyamide composition by melt kneading the polyamide and the ethylenic copolymer and then melt kneading the resulting polyamide composition with the inorganic material.

* * * * *